United States Patent
Mäkelä et al.

(10) Patent No.: US 7,318,170 B2
(45) Date of Patent: Jan. 8, 2008

(54) PROTECTION OF NON-VOLATILE MEMORY COMPONENT AGAINST DATA CORRUPTION DUE TO PHYSICAL SHOCK

(75) Inventors: Jakke Mäkelä, Turku (FI); Marko Ahvenainen, Ruutana (FI)

(73) Assignee: Spyder Navigations, LLC, Wilmington, DE (US)

( * ) Notice: Subject to any disclaimer, the term of this patent is extended or adjusted under 35 U.S.C. 154(b) by 613 days.

(21) Appl. No.: 10/888,283

(22) Filed: Jul. 9, 2004

(65) Prior Publication Data

US 2006/0010340 A1    Jan. 12, 2006

(51) Int. Cl.
*G06F 11/00* (2006.01)

(52) U.S. Cl. .................... 714/22; 714/24; 713/324; 713/340

(58) Field of Classification Search .................. 714/24, 714/22; 713/324, 340
See application file for complete search history.

(56) References Cited

U.S. PATENT DOCUMENTS

| | | | |
|---|---|---|---|
| 4,763,333 A * | 8/1988 | Byrd ........................... 714/22 |
| 5,227,929 A | 7/1993 | Comerford .................... 360/75 |
| 5,577,195 A * | 11/1996 | Gochi ........................... 714/22 |
| 5,982,573 A | 11/1999 | Henze ........................... 360/75 |
| 5,991,114 A | 11/1999 | Huang et al. ................. 360/75 |
| 6,263,453 B1 * | 7/2001 | Anderson ..................... 714/22 |
| 6,567,709 B1 | 5/2003 | Malm et al. .................. 700/21 |
| 6,711,701 B1 * | 3/2004 | Roohparvar et al. .......... 714/24 |
| 6,988,222 B2 * | 1/2006 | Sparer .......................... 714/22 |
| 7,000,133 B2 * | 2/2006 | Dodd et al. .................. 713/324 |

\* cited by examiner

*Primary Examiner*—Yolanda L Wilson
(74) *Attorney, Agent, or Firm*—Foley & Lardner LLP

(57) ABSTRACT

This invention provides a method to operate a terminal (100), as well as a terminal that operates in accordance with the method. The method includes, in response to initiating a data write operation with a non-volatile memory device (132), activating a sensor (190) that is capable of detecting that the terminal is falling; during the write operation, monitoring the sensor to determine if the terminal is falling and, if it is determined that the terminal is falling, terminating the write operation and executing a non-volatile memory shutdown procedure, else, if it is determined that the terminal is not falling, completing the write operation and deactivating the sensor.

35 Claims, 2 Drawing Sheets

PROTECTION OF NON-VOLATILE MEMORY COMPONENT AGAINST DATA CORRUPTION DUE TO PHYSICAL SHOCK

TECHNICAL FIELD

This invention relates generally to data storage memory devices and components and, more specifically, relates to the protection of data stored in a non-volatile memory device during a physical shock to a unit that contains the memory device.

BACKGROUND

All solid state non-volatile memory devices that are known to the inventors, including Flash memory, MultiMedia Card (MMC), and Subscriber Identity Module (SIM), are vulnerable to an abrupt termination of power. As but one example, a file-control system or the memory contents can be corrupted if the power-off occurs during a write sequence, such as during a file-control table update procedure. While this problem can exist in any electronic system that incorporates one or more non-volatile memory devices, the problem is especially acute in handheld portable electronic systems that are subject to frequency handling by the user. Examples of such systems include, but are not limited to, cellular telephones, personal digital assistants (PDAs), portable computers, image capture devices such as digital cameras, gaming devices, music appliances and handheld units or terminals that incorporate combinations of two or more such functions.

The abrupt and unexpected interruption of power can occur when the terminal is dropped due to one or more of a number of occurrences. For example, dropping the terminal can result in the movement or expulsion of the battery, leading to an abrupt and uncontrolled power-off condition. Dropping the terminal may also result in the movement or expulsion of the memory component itself, such as a plug-in memory card. This can also lead to an abrupt and uncontrolled power-off condition, as well as an abrupt termination of the memory component digital input/outlines and the signals conveyed thereby.

It is known in the art to provide some protection for rotating magnetic media (a hard disk drive, or HDD). For example, U.S. Pat. No. 5,982,573, entitled "Disk Drive and Method for Minimizing Shock-induced Damage", describes a disk drive having a fall detection control system that detects when the disk drive is in a free fall, and takes precautionary protective action to minimize physical damage from any resulting shock upon impact. The disk drive includes an accelerometer device that measures acceleration of the disk drive along three mutually orthogonal axes x, y, and z, and resolves the measurement into respective vectors. A processor is programmed to compute a net acceleration of the disk drive, compare the net acceleration with a selected acceleration threshold level, measure a duration that the net acceleration exceeds the acceleration threshold level, compare the measured duration with a selected reference time period, and output a warning signal when the measured duration exceeds the reference time period. Upon receipt of the warning signal, a controller initiates protective routines in preparation for shock.

Also of interest is U.S. Pat. No. 6,567,709, "Integrated Monitoring, Diagnostics, Shut-down and Control System"; U.S. Pat. No. 5,991,114. "Disc Drive Having Gram Load Reducer and Method of Operating Gram Load Reducer", and U.S. Pat. No. 5,227,929, "Portable Computer Hard Disk Protective Reflex System".

Prior to this invention, the inventors are not aware of any protective mechanisms or methods for solid state memory devices to avoid data corruption due to an impact after a fall.

SUMMARY OF THE PREFERRED EMBODIMENTS

The foregoing and other problems are overcome, and other advantages are realized, in accordance with the presently preferred embodiments of these teachings.

In one aspect this invention provides a method to operate a terminal. The method includes, in response to initiating an operation, such as a data write operation, with a non-volatile memory device, activating a sensor that is capable of detecting that the terminal is falling; during the operation, monitoring the sensor to determine if the terminal is falling and, if it is determined that the terminal is falling, terminating the operation, else, if it is determined that the terminal is not falling, completing the write operation and deactivating the sensor. Terminating the operation can include executing a non-volatile memory shutdown procedure.

The sensor may be operated at a sampling rate that is selected to minimize sensor power consumption within constraints imposed by at least one characteristic, such as the amount of time required to execute the shutdown procedure, of the non-volatile memory device that the write operation is directed to.

Further aspects of this invention relate to a terminal that operates in accordance with the method, and a wireless communications terminal having an accelerometer-based sensor that operates in accordance with the method.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
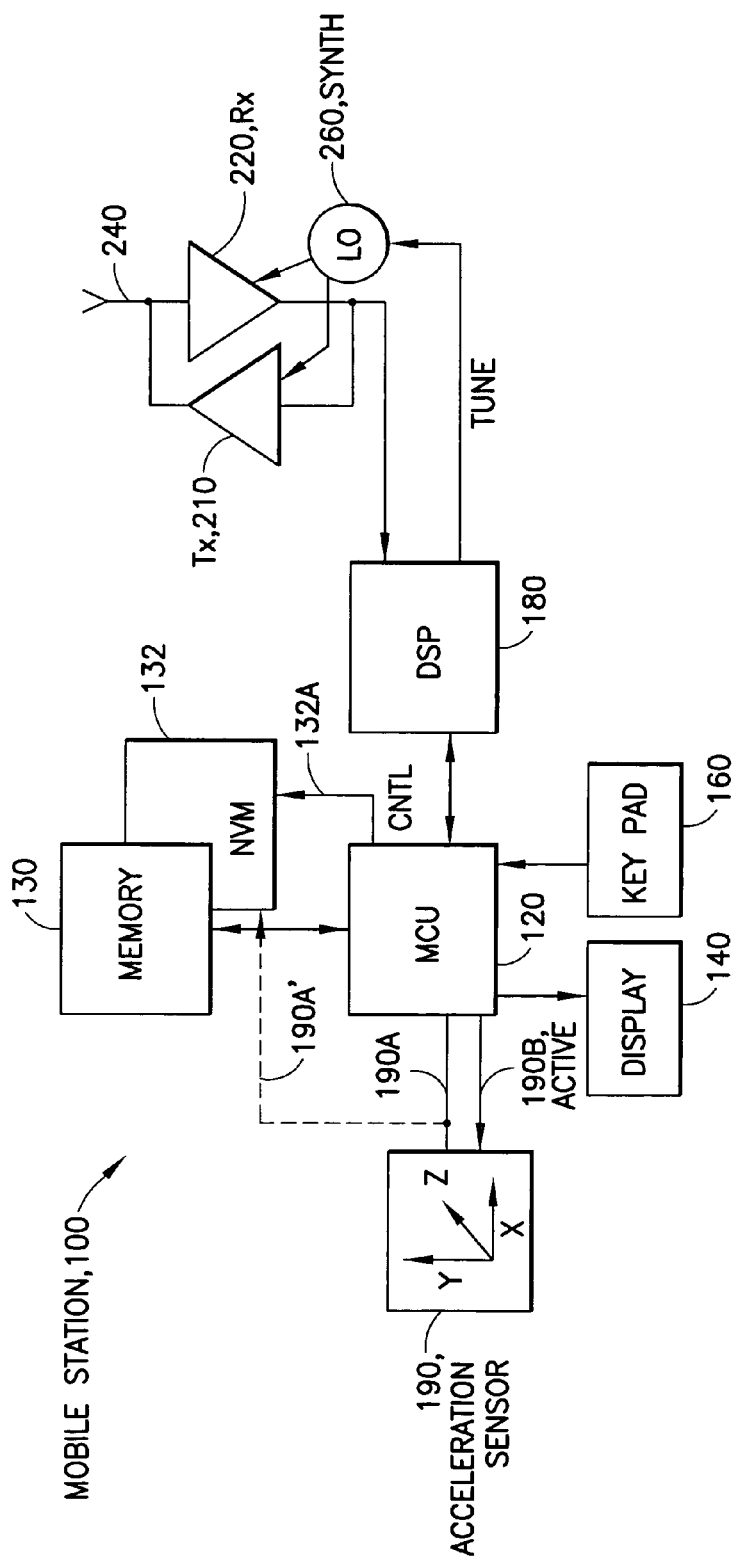
FIG. 1 is a block diagram showing a mobile station that is constructed and operated in accordance with this invention.

FIG. 1 is a simplified block diagram an embodiment of a wireless communications terminal or mobile station 100 in accordance with this invention. It should be noted, however, that this invention applies to many different types of handheld, portable and other types of terminals, including those that have no wireless communications capability. For example, the terminals that can benefit from the use of this invention include, but are not limited to, cellular telephones, such as the one depicted in FIG. 1, as well as gaming devices, digital cameras, PDAs, navigation (e.g., GPS) devices, data logging devices, portable bar code scanners, Internet appliances and, in general, any type of electronic equipment that includes at least one non-volatile memory device that is writable during the normal operation of the device. As employed herein a non-volatile memory device can be a device that is designed and engineered to retain data when the system operating power is removed (e.g., Flash memory devices), as well as a volatile memory device (e.g., a static RAM) that is packaged or otherwise connected to a separate backup battery or a charge storage capacitor.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator.

The MCU 120 is assumed to include or be coupled to some type of a memory, including a non-volatile memory (NVM) 132 for storing an operating program and other information, as well as a volatile memory 130 for temporarily storing required data, scratchpad memory, received packet data, packet data to be transmitted, and the like. The operating program is assumed, for the purposes of this invention, to enable the MCU 120 to execute the software routines, layers and protocols required to implement the methods in accordance with this invention, as well as to provide a suitable user interface (UI), via display 140 and keypad 160, with a user. Although not shown, a microphone and speaker are typically provided for enabling the user to conduct voice calls in a conventional manner.

Although not germane to an understanding of this invention, the mobile station 100 also contains a wireless section that includes a digital signal processor (DSP) 180, or equivalent high speed processor or logic, as well as a wireless transceiver that includes a transmitter 210 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240 in accordance with an air interface standard that may conform to any standard or protocol.

The mobile station 100 also includes an free fall sensor, embodied in this non-limiting embodiment as an acceleration sensor 190, such as an accelerometer that has three sensitive axes. The acceleration sensor 190 is used to detect that the mobile station 100 is falling, and thus senses the acceleration of the mobile station 100 due to gravity. The output of the acceleration sensor 190 is designated as 190A, while an input signal to the sensor 190 that activates the sensor is designated as Activate 190B.

The NVM 132 can include a single type of memory, or it may present a plurality of different memory types, such as two or more of Flash memory, MultiMedia Card (MMC) memory and a Subscriber Identity Module (SIM) that contains a non-volatile memory device. Each NVM 132 component is assumed to be responsive to a specified signal with which it is either shut down, put into a sleep mode, or placed into a safe mode in which no corruption of stored data can occur. This signal is shown in FIG. 1 as Control (CNTL) 132A that is sourced by the MCU 120. In other embodiments the CNTL signal 132A could be sourced by the DSP 180, or by dedicated logic.

When the acceleration sensor 190 detects a free-fall situation, its sends a pre-defined signal to the MCU 120 over signal line 190A. The MCU 120 in response sends the predefined shutdown signals to each of the NVM 132 components via the Control signal line 132A.

In a preferred embodiment, the acceleration sensor 190 is only turned on or activated, i.e., placed in a full power mode of operation with the Activate signal 190B, when a write operation is being performed to one of the NVM 132 components. In this way a power savings is realized, as the mobile station 100 will typically be powered by an internal battery (not shown).

Figure 2:
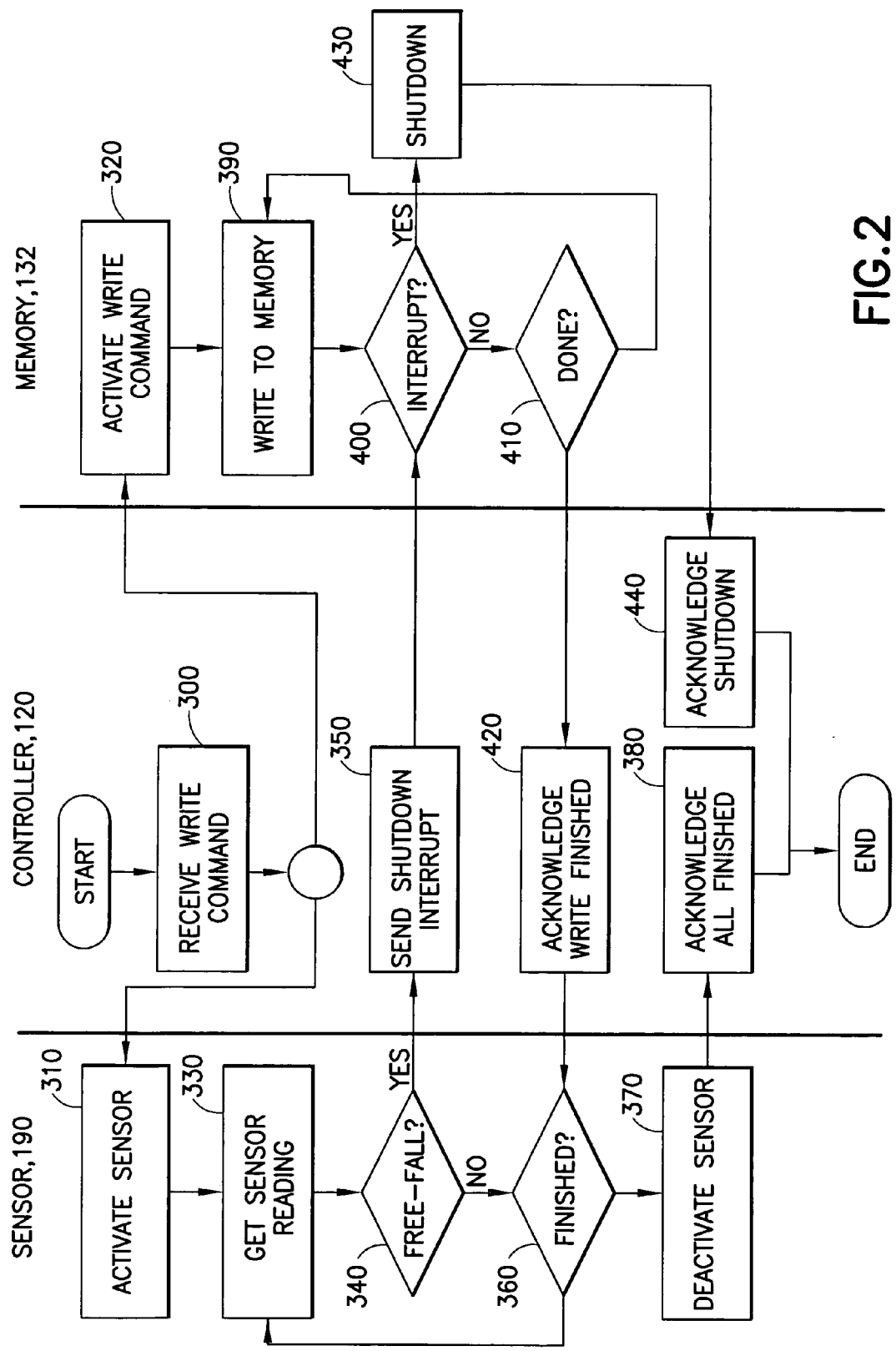
FIG. 2 is a logic flow diagram of a method to operate the mobile station of FIG. 1.

Referring to FIG. 2, at Block 300 the controller (MCU) 120 receives (or originates) a write command for the NVM 132. In response the MCU 120 activates in Block 310 the sensor 190 via signal line 190B, and also activates a write memory command to the NVM 132 (Block 320). Continuing for convenience at the acceleration sensor 190, at Blocks 330, 340 and 360 a sensing loop is executed to get the sensor reading and determine if a free fall condition (shock) is indicated. The loop is executed until the NVM 132 write operation is indicated as being finished by the output of Block 420 or a free fall condition has been indicated. If a free fall condition is indicated, Block 340 transitions to Block 350 to send a shutdown interrupt (CNTL 132A) to the NVM 132. Assuming that the write operation concludes normally, Block 360 transitions to Block 370 to deactivate the acceleration sensor 190 via signal line 190B, and then transitions to Block 380 to acknowledge completion.

At the NVM 132, in response to the activation of the write command at Block 320, the data is written to the memory at Block 390, and a loop 390, 400, 410 is executed until the NVM write operation is signaled as being completed at Block 410. Block 410 sends the completion signal to controller block 420, which sends the acknowledgment of the write operation being completed to Block 360 of the sensor 190. The write loop Block 400 tests to see if the shut down interrupt has been generated by the controller Block 350 (CNTL 132A is asserted). If the shut down interrupt is generated, then Block 400 transitions to Block 430 to terminate the write operation, and execute the shutdown procedure that is specific to the NVM 132. For example, and depending on the type of NVM, the shutdown procedure can entail actually shutting off the NVM 132, or putting the NVM 132 into a sleep (low power consumption) mode, or otherwise placing the NVM 132 into some type of safe mode in which no corruption of stored data is likely to occur. In some embodiments the safe mode may simply be an idle mode, where no active read or write operation is occurring. Block 430 may then transition to controller Block 440 to acknowledge the NVM 132 shutdown has occurred, and the method ends.

During the use of the preferred embodiments of this invention some variations to the foregoing methods can be made. For example, in response to receiving the write command at Block 300, the controller 120 may first check the free fall sensor at 340 to ensure that a free fall condition is not currently indicated before executing a transition to block 320 to activate the write command. Further by example, for those storage technologies where the NVM 132 should be actively shut down after sensing a free fall condition, such as when using a hard disk drive (HHD), the method shown in FIG. 2 may be used as well for read operations, and not just for write operations.

It is preferred to partition critical data into small enough portions that a write operation can be accomplished during the free fall time.

It is also within the scope of this invention for the MCU 120 to optimize the sampling frequency (and hence power consumption) of the acceleration sensor 190 when a drop threshold is known, as described below.

A suitable free fall detection method is as follows (Blocks 330, 340, 360 of FIG. 2). During free fall, the acceleration is always one g. Thus the acceleration sensor 190 output can be activated when the measured acceleration reaches a predetermined level (such as 0.4-1 g due to the need to account for sensor errors). The time of free fall is measured, giving the distance fallen as $x(t)=g*t^2/2$. A threshold time of free fall is preferably made as long as possible, to allow vibrations to be distinguished from a free fall. When the measured x(t) exceeds the predefined threshold X0, the Control signal 132A is asserted to the NVM 132 to place the NVM(s) 132 into a state where the corruption of stored data is unlikely, should the mobile station experience an impact on a hard surface (Block 430 of FIG. 2).

In the prior art a time threshold of about 125 msec is known to correspond to a drop of about seven centimeters, which is suggested as a threshold for initializing a HDD protection mechanism.

However, for a mobile terminal, such as the mobile station 100, the thresholds of interest are somewhat different. A standard mobile station 100 drop test height is 1.5 m. Because of the acceleration, the threshold time (T) increases mores slowly than the altitude (X), namely:

| X0 | T0 |
|---|---|
| 0.5 m | 320 msec |
| 1 m | 450 msec |
| 1.5 m | 550 msec |

Assume that the maximum time required to activate the NVM 132 shutdown sequence is TM. An exact value for TM can be difficult to determine, due to the requirements of different NVM 132 technologies. However, for an exemplary MMC card the value of TM is in the range of a few tens of milliseconds. Thus, a non-limiting and exemplary value of 100 ms is used below.

Let the sampling period of the acceleration sensor 190 be FS Hz, which means that the acceleration is sampled once every TS=1/FS seconds. There is thus a "dead time" of TM+1/FS seconds. Thus, the actual threshold time TT available for the measurement of free fall becomes:

$$TT=T0-TM-TS=\sqrt{2*x0/g}-TM-1/FS.$$

This allows a minimum value for FS to be defined, when it is desired that TT be above a defined minimum TTMIN in order to eliminate spurious effects. Thus, the sampling of the acceleration sensor 190 during a NVM 132 write operation can be optimized to conserve battery power.

As a numerical example: assume that TTMIN=100 msec is a sufficient amount of time, assume that TM=100 msec, and assume that the drop height threshold is one meter, then TT>TTMIN=0.1 s=0.45 s−0.1 s−1/FS, which means that an acceleration sensor 190 sampling frequency of 4 Hz is adequate. If the acceptable drop altitude is increased to 1.5 m, then the sampling frequency can be 2.9 Hz, while a reduced 0.5 m drop height requires a 8.3 Hz sampling frequency.

This variability allows the use of an optional feature in the basic drop detection NVM 132 shutdown algorithm: i.e., if there are large variations between the TM for various NVM 132 components, then a Sensor Activation flag (Activate Sensor Block 310 of FIG. 2) can include the TM for the NVM 132 component which launched the sensor (or the required sampling rate directly). That is, the acceleration sensor 190 sampling rate can be made adaptive, and established at Block 310 depending on which NVM 132 component the write operation is being performed to. This allows the sampling rate to be minimized to accommodate the specific NVM component which is to be protected. For example, and assuming the case of a one meter drop distance: if TM=0.1 s, then FS=4.0 Hz (as above); if TM=0.05 s, then FS=3.3 Hz, and if TM=0.01 s, then FS=2.9 Hz.

The resulting approximately 30% reduction in sampling rate (and roughly the same in power consumption) can be quite significant in the mobile station 100.

The use of this invention is advantageous in that it minimizes the chance for the corruption of NVM data due to inadvertently dropping the mobile station 100. This is especially advantageous in the case of memory cards, such as a SIM card, that can be reused in another mobile station or terminal in the event that the dropped mobile station is damaged.

In another embodiment of this invention acceleration sensor 190 sends the free fall signal 190A directly to each NVM 132, such as by a shared bus (shown as a dashed line 190A' in FIG. 1). While this is a faster operating solution, since the MCU 120 is bypassed, its use implies that either the NVM memory 132 components convert the free-fall signal to a shutdown signal, or that the acceleration sensor 190 generates and transmits the appropriate NVM 132 shutdown signal(s) (CNTL 132A).

Based on the foregoing description it should be apparent that a non-limiting aspect of this invention is a computer program embodied on a computer readable storage medium, such as the memory 130 in FIG. 1, that is comprised of instructions to direct a computer, such as the MCU 120 in FIG. 1, that is embodied in an enclosure, such as the mobile station 100, to be responsive to initiating an operation, such as read operation, a write operation, or a read/modify/write operation, with a non-volatile memory device 132 to activate a sensor 190 that is capable of detecting that the enclosure is falling. During the operation the instructions direct the computer to monitor the sensor to determine if the enclosure is falling and, if it is determined that the enclosure is falling, to terminate the operation and to execute a non-volatile memory shutdown procedure. If it is determined instead that the enclosure is not falling, the operation is completed and the sensor is deactivated.

Monitoring can include operating the sensor at a sampling rate that is selected based on the type of non-volatile memory device that the operation is directed to; or operating the sensor at a sampling rate that is selected based on an amount of time required to execute the non-volatile memory device shutdown procedure; or operating the sensor at a sampling rate that is selected based on a predetermined minimum threshold distance over which the enclosure can fall; or operating the sensor at a sampling rate that is selected to minimize sensor power consumption within constraints imposed by at least one characteristic of the non-volatile memory device that the operation is directed to. The sensor may be operated at a sampling rate that is based on more than one of these criteria, either alone or in combination with even further criteria.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other types of free fall sensors, such as a barometer/altimeter or a proximity sensor (acoustic or optical), may occur to those skilled in the art, as may also the use of other types of NVM 132 components. However, all such and similar modifications of the teachings of the preferred embodiments of this is invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A method to operate a terminal, comprising:
   in response to initiating a data write operation with a non-volatile memory device, activating a sensor that is capable of detecting that the terminal is falling;
   during the write operation, monitoring the sensor to determine if the terminal is falling; and
   if it is determined that the terminal is falling, terminating the write operation and executing a non-volatile memory shutdown procedure, else, if it is determined that the terminal is not falling, completing the write operation and deactivating the sensor.

2. A method as in claim 1, where monitoring includes operating the sensor at a sampling rate that is selected based on a type of non-volatile memory device that the write operation is directed to.

3. A method as in claim 1, where monitoring includes operating the sensor at a sampling rate that is selected based on an amount of time required to execute the non-volatile memory device shutdown procedure.

4. A method as in claim 1, where monitoring includes operating the sensor at a sampling rate that is selected based on a predetermined minimum threshold distance over which the terminal can fall.

5. A method as in claim 1, where monitoring includes operating the sensor at a sampling rate that is selected to minimize sensor power consumption within constraints imposed by at least one characteristic of the non-volatile memory device that the write operation is directed to.

6. A terminal that comprises:
   at least one non-volatile memory device, a sensor capable of detecting that the terminal is falling, and
   controller coupled to the non-volatile memory device, said controller operating in response to initiating a data write operation with the non-volatile memory device to activate the sensor and during the write operation, to monitor the sensor to determine if the terminal is falling and, if it is determined that the terminal is falling, to terminate the write operation and to cause the non-volatile memory device to execute a non-volatile memory shutdown procedure, else, if it is determined that the terminal is not falling, to allow the write operation to complete and to deactivate the sensor.

7. A terminal as in claim 6, where the sensor is operated at a sampling rate that is selected based on a type of non-volatile memory device that the write operation is directed to.

8. A terminal as in claim 6, where the sensor is operated at a sampling rate that is selected based on an amount of time required to execute the non-volatile memory device shutdown procedure.

9. A terminal as in claim 6, where the sensor is operated at a sampling rate that is selected based on a predetermined minimum threshold distance over which the terminal can fall.

10. A terminal as in claim 6, where the sensor is operated at a sampling rate that is selected to minimize sensor power consumption within constraints imposed by at least one characteristic of the non-volatile memory device that the write operation is directed to.

11. A terminal as in claim 6, where an output of the sensor is coupled to the controller for indicating that the sensor has detected that the terminal is falling, and where the controller is responsive to the sensor output to terminate the write operation and to cause the non-volatile memory device to execute the non-volatile memory shutdown procedure.

12. A terminal as in claim 6, where an output of the sensor is coupled to the non-volatile memory device for indicating that the sensor has detected that the terminal is falling, and where the non-volatile memory device is responsive to the sensor output to terminate the write operation and to execute the non-volatile memory shutdown procedure.

13. A terminal as in claim 6, where said terminal comprises a wireless communications device.

14. A wireless communications terminal that comprises:
    at least one non-volatile memory device,
    an acceleration sensor and
    a controller coupled to the non-volatile memory device, said controller operating in response to initiating a data write operation with the non-volatile memory device to activate the sensor, and during the write operation to monitor the sensor to determine if the terminal is accelerating at a rate that indicates that the terminal is falling, and, if it is determined that the terminal is falling, to terminate the write operation and to cause the non-volatile memory device to execute a non-volatile memory shutdown procedure, else, if it is determined that the terminal is not accelerating at a rate that indicates that the terminal is falling, to allow the write operation to complete and to deactivate the sensor.

15. A wireless communications terminal as in claim 14, where the sensor is operated at a sampling rate that is selected based on a type of non-volatile memory device that the write operation is directed to.

16. A wireless communications terminal as in claim 14, where the sensor is operated at a sampling rate that is selected based on an amount of time required to execute the non-volatile memory device shutdown procedure.

17. A wireless communications terminal as in claim 14, where the sensor is operated at a sampling rate that is selected based on a predetermined minimum threshold distance over which the terminal can fall.

18. A wireless communications terminal as in claim 14, where the sensor is operated at a sampling rate that is selected to minimize sensor power consumption within constraints imposed by at least one characteristic of the non-volatile memory device that the write operation is directed to.

19. A wireless communications terminal as in claim 14, where an output of the sensor is coupled to the controller, and where the controller is responsive to the sensor output to terminate the write operation and to cause the non-volatile memory device to execute the nonvolatile memory shutdown procedure.

20. A wireless communications terminal as in claim 14, where an output of the sensor is coupled to the non-volatile memory device, and where the non-volatile memory device responsive to the sensor output to terminate the write operation and to execute the non-volatile memory shutdown procedure.

21. A wireless communications terminal as in claim 14, where said non-volatile memory device is comprised of at least one of a Flash memory device, a MultiMedia Card (MMC) and Subscriber Identity Module (SIM).

22. A terminal that comprises:
    at least one non-volatile memory device, a sensor capable of detecting that the terminal is falling, and a controller coupled to the non-volatile memory device, said controller operating in response to initiating an operation with the non-volatile memory device to activate the sensor, and during the operation, to monitor the sensor to determine if the terminal is falling and, if it is determined that the terminal is falling, to terminate the operation, else, if it is determined that the terminal is not falling, to allow the operation to complete and to deactivate the sensor.

23. A terminal as in claim 22, where the sensor is operated at a sampling rate that is selected based on a type of non-volatile memory device that the write operation is directed to.

24. A terminal as in claim 22, where the sensor is operated at a sampling rate that is selected based on an amount of time required to execute a non-volatile memory device shutdown procedure.

25. A terminal as in claim 22, where the sensor is operated at a sampling rate that is selected based on a predetermined minimum threshold distance over which the terminal can fall.

26. A terminal as in claim 22, where the sensor is operated at a sampling rate that is selected to minimize sensor power consumption within constraints imposed by at least one characteristic of the non-volatile memory device that write operation is directed to.

27. A terminal as in claim 22, where an output of the sensor is coupled to the controller for indicating that the sensor has detected that the terminal is falling, and where the controller is responsive to the sensor output to terminate the operation and to cause the non-volatile memory device to execute a non-volatile memory shutdown procedure.

28. A terminal as in claim 22, where an output of the sensor is coupled to the non-volatile memory device for indicating that the sensor has detected that the terminal is filling and where the non-volatile memory device is responsive to the sensor output to terminate the operation and to execute a non-volatile memory shutdown procedure.

29. A terminal as in claim 22, where said terminal comprises a wireless communications device.

30. A computer program product having a computer readable medium with computer readable program code stored thereon said computer readable code comprising:

instructions to direct a computer, embodied in an enclosure, to be responsive to initiating an operation with a non-volatile memory device to activate a sensor that is capable of detecting that the enclosure is falling; during the operation, to monitor the sensor to determine if the enclosure is falling and, if it is determined that the enclosure is falling, to terminate the operation and to execute a non-volatile memory shutdown procedure, else, if it is determined that the enclosure is not falling, to complete the operation and to deactivate the sensor.

31. A computer program product as in claim 30, where the operation is at least one of a write operation and a read operation.

32. A computer program product as in claim 30, where monitoring includes operating the sensor at a sampling rate that is selected based on a type of non-volatile memory device that the operation is directed to.

33. A computer program product as in claim 30, where monitoring includes operating the sensor at a sampling rate that is selected based on an amount of time required to execute the non-volatile memory device shutdown procedure.

34. A computer program product as in claim 30, where monitoring includes operating the sensor at a sampling rate that is selected based on a predetermined minimum threshold distance over which the enclosure can fall.

35. A computer program product as in claim 30, where monitoring includes operating the sensor at a sampling rate that is selected to minimize sensor power consumption within constraints imposed by at least one characteristic of the non-volatile memory device that the operation is directed to.

* * * * *

UNITED STATES PATENT AND TRADEMARK OFFICE
CERTIFICATE OF CORRECTION

PATENT NO. : 7,318,170 B2
APPLICATION NO. : 10/888283
DATED : January 8, 2008
INVENTOR(S) : Jakke Makela and Marko Ahvenainen It is certified that error appears in the above-identified patent and that said Letters Patent is hereby corrected as shown below:

Column 7, line 40
Insert --a-- before the word "controller".

Column 8, line 57
Insert --is-- after the word "device".

Column 9, line 38
Delete "filling" and replace with --falling--.

Signed and Sealed this

Twenty-seventh Day of May, 2008

JON W. DUDAS
*Director of the United States Patent and Trademark Office*